United States Patent
Abdelnour

(10) Patent No.: US 6,421,197 B1
(45) Date of Patent: Jul. 16, 2002

(54) OPTIMAL READER/WRITER OFFSETS AND WRITE FAULT THRESHOLDS IN A DISC DRIVE

(75) Inventor: Ghassan M. Abdelnour, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/510,132

(22) Filed: Feb. 22, 2000

Related U.S. Application Data

(60) Provisional application No. 60/121,028, filed on Feb. 22, 1999.

(51) Int. Cl.[7] .............................................. G11B 5/596
(52) U.S. Cl. .................................................... 360/77.02
(58) Field of Search ............................... 360/60, 77.04, 360/76, 77.01, 77.02, 77.08

(56) References Cited

U.S. PATENT DOCUMENTS

| | | |
|---|---|---|
| 4,799,112 A | 1/1989 | Bremmer et al. |
| 4,821,125 A | 4/1989 | Christensen et al. |
| 5,047,876 A | 9/1991 | Holsinger |
| 5,107,378 A | 4/1992 | Cronch et al. |
| 5,262,907 A | 11/1993 | Duffy et al. |
| 5,408,367 A | 4/1995 | Emo |
| 5,530,705 A | 6/1996 | Malone, Sr. |
| 5,570,244 A * | 10/1996 | Wiselogel .................... 360/60 |
| 5,687,036 A | 11/1997 | Kassab |
| 5,774,285 A | 6/1998 | Kassab et al. |
| 5,790,333 A | 8/1998 | Kimura et al. |
| 6,067,205 A * | 5/2000 | Mathews et al. ......... 360/77.04 |
| 6,078,461 A * | 6/2000 | Smith et al. ............. 360/77.08 |

FOREIGN PATENT DOCUMENTS

EP          0 929 067 A1        7/1999

* cited by examiner

*Primary Examiner*—David Hudspeth
*Assistant Examiner*—K. Wong
(74) *Attorney, Agent, or Firm*—Crowe & Dunlevy

(57) ABSTRACT

A method for optimizing data transfer performance in a disc drive through selection of optimal reader/writer offsets and write fault thresholds. An initial offset for a selected track is determined as the radial distance between read and write elements of a head as the head is positioned adjacent a selected track. Asymmetric write fault thresholds are selected on opposing sides of the center of the selected track in relation to the ability of the read element to successfully recover data written to the track. An adjustment value is determined in relation to the asymmetry of the write fault thresholds, and the adjustment value is used to modify the initial offset to form a final offset, as well as to make the write fault thresholds symmetric about the center of the track.

9 Claims, 10 Drawing Sheets

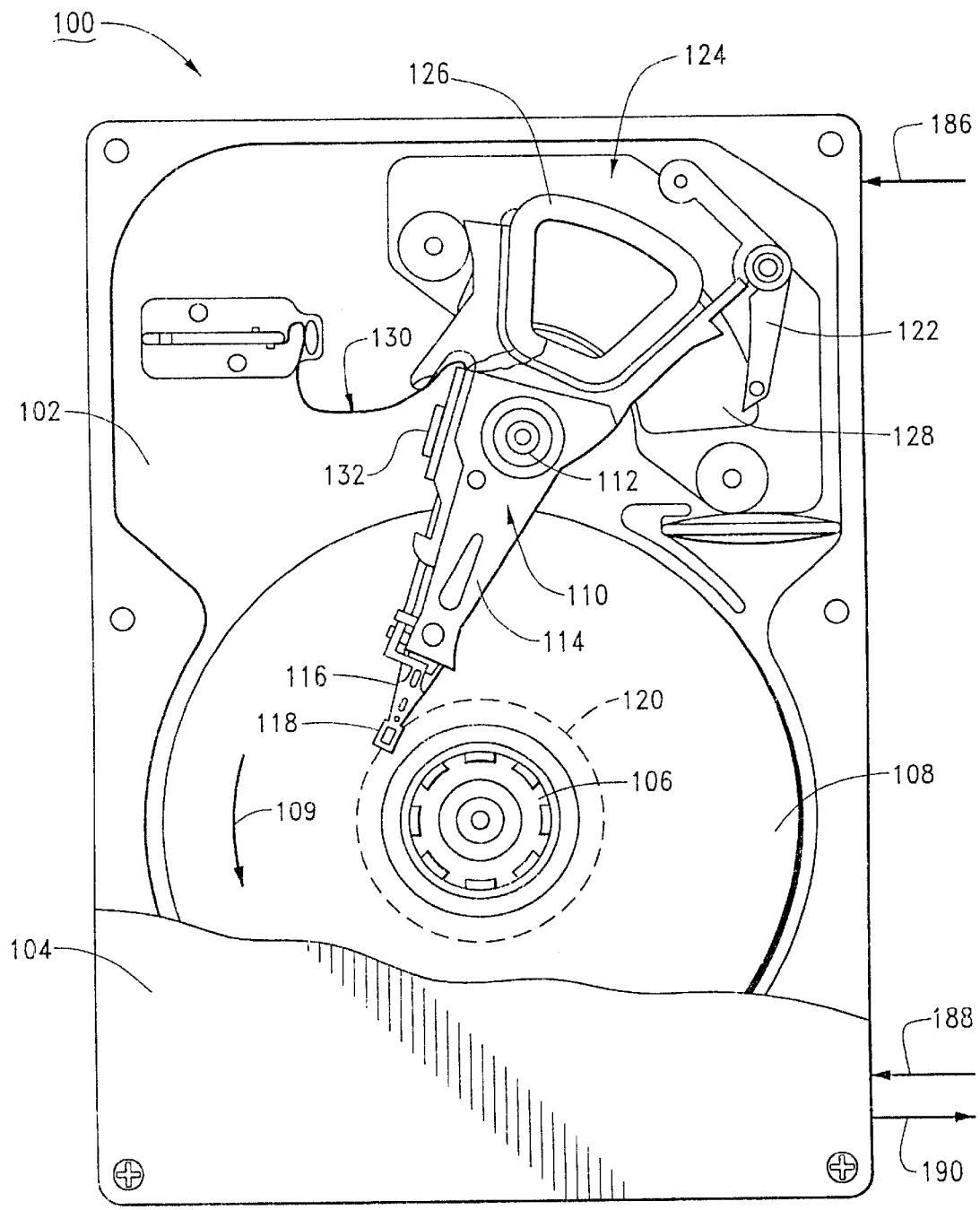
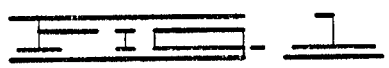

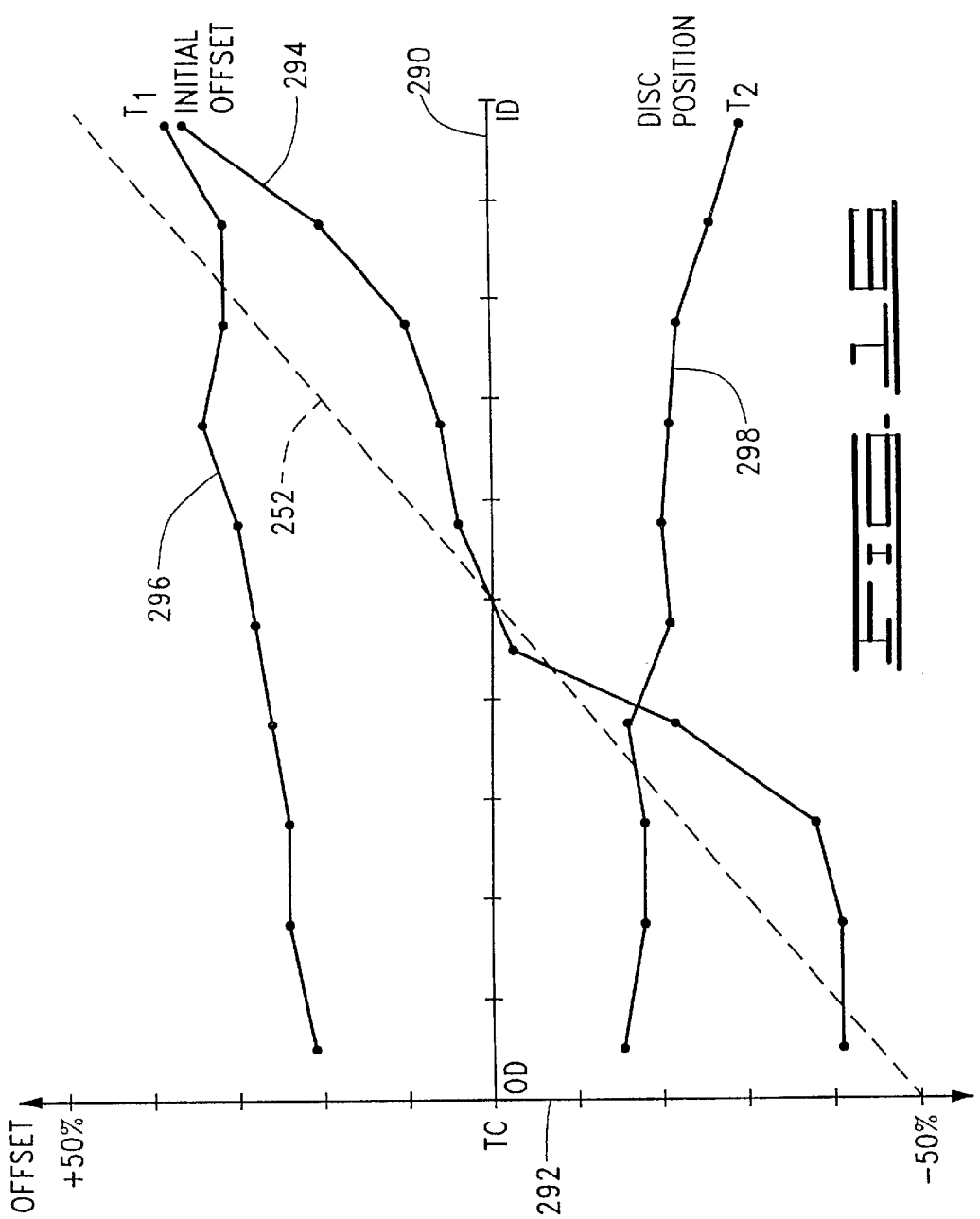

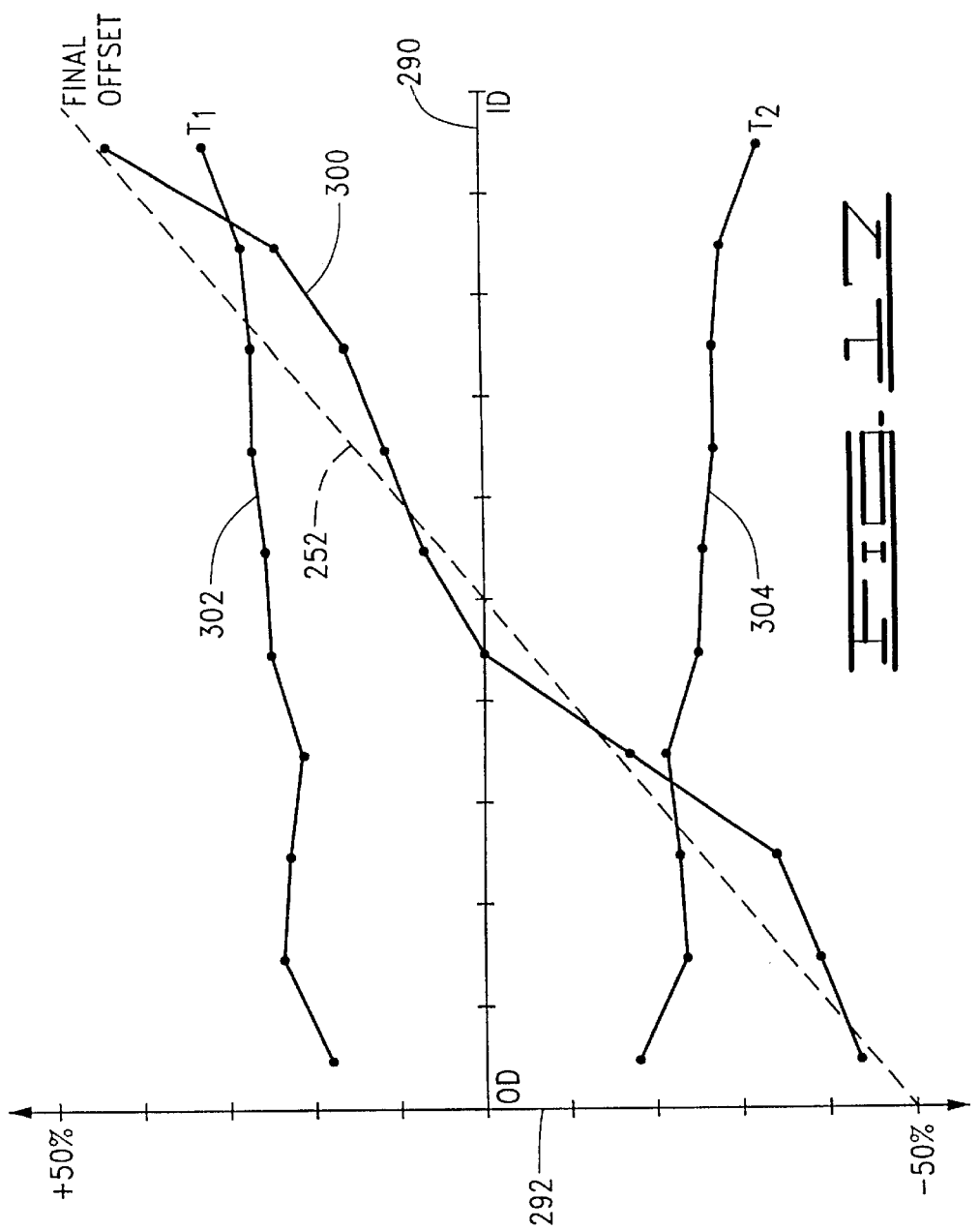

OPTIMAL READER/WRITER OFFSETS AND WRITE FAULT THRESHOLDS IN A DISC DRIVE

RELATED APPLICATIONS

This application claims priority to U.S. Provisional Application No. 60/121,028 filed Feb. 22, 1999.

FIELD OF THE INVENTION

This invention relates generally to the field of disc drive storage devices, and more particularly, but not by way of limitation, to improving data transfer performance of a disc drive by selecting optimal reader/writer offsets and write fault thresholds by head and disc location.

BACKGROUND OF THE INVENTION

Disc drives are digital data storage devices which utilize one or more rotatable magnetic discs to store and retrieve computer data. A plurality of controllably positionable read/write heads are used to selectively magnetize tracks on the disc surfaces to store data, and to transduce the selective magnetization of the tracks to retrieve data to a host computer in which the disc drive is mounted.

Typically, each track includes a number of servo fields which are periodically interspersed with user data fields. The user data fields are used to store computer data and the servo fields store prerecorded servo information used by a disc drive servo system to control the position of the heads.

The servo system operates in two primary modes: seeking and track following. During a seek, a selected head is moved from an initial track to a destination track on the corresponding disc surface in relation to a defined velocity profile. Thereafter, the servo system switches to the track following mode of operation so that the head is maintained over the destination track until a subsequent head switch or seek operation is performed.

Each head includes a write element to write the data to the tracks and a read element which reads the user data and the servo data from the track. A typical write element comprises a thin film inductive coil having a write gap that, when subjected to a time-varying write current indicative of the data to be stored, generates a corresponding time-varying magnetic field across the gap which selectively magnetizes the tracks. A typical read element construction includes a magneto-resistive (MR) material characterized as having a changed electrical resistance when subjected to a magnetic field of selected orientation. Stored data are recovered by passing a read bias current through the read element and detecting changes in voltage thereacross in response to the magnetization of the tracks. Although head constructions can vary, the effective size of the write element is typically larger (with respect to track width) than the size of the read element, and the effective centers of the read and write elements may be physically offset within the head.

To maintain data integrity and high data transfer rates, it is critical that the read and write elements be respectively maintained as close as practicable over the center of each track during read and write operations. For example, even if data are properly written in a centered relationship over a selected track, attempting to subsequently read the data while the head is positioned a sufficient distance away from the center of the track may result in an unacceptable number of read errors, due to the inability of the read element to properly detect the written data, as well as the potential interference from the selective magnetization of an adjacent track. More significantly, writing data too far away from the track center can prevent subsequent recovery when the head is centered over the track, and can also corrupt data stored on the adjacent track.

Disc drives utilize read fault and write fault thresholds to minimize the occurrence of read errors and data overwriting. These thresholds are expressed as a percentage of track width and define zones about the center of the tracks in which safe reading and writing can take place. For example, a typical read fault threshold might be established at ±10% of the track width, so that read operations are enabled only while the head is less than 10% of the track width away from the center of the track. Similarly, a typical write fault threshold might be established at ±20%, so that write operations are enabled only while the head is less than 20% away from the center of the track. During read and write operations, the servo system continually monitors the position of the respective elements and causes the interruption of the respective operation if the threshold is reached or exceeded. The thresholds are determined during disc drive design and are intended to balance various factors including track density, acceptable read error rates, expected variations in the sizes of the read and write elements, and acceptable data transfer rates.

Extended read and write operations often involve the accessing of multiple tracks by a single head, and can further involve the accessing of multiple tracks by multiple heads. In order to maximize data transfer performance of a disc drive, it is desirable to begin reading or writing data as soon as the head is sufficiently settled onto each accessed track. In practice, disc drives typically monitor the position of the head as it is settled onto each track and initiate the respective read or write operation as soon as the head is within the respective fault threshold (and the head is over the desired user data field).

Hence, while tightening the read and write fault tolerances of a disc drive results in corresponding improvements in error rate performance by the drive, it also undesirably degrades the transfer rate performance of the drive, because it takes longer to ensure the head is sufficiently settled onto the destination track (and maintained in proper relation thereto) before commencing the respective read or write operation.

Tightening the read and write fault thresholds also places greater strains upon the servo system to maintain the heads within the defined acceptable read and write zones, resulting in a greater number of interruptions in the data transfer process as read and write faults are declared and resolved. Tightening the read and write fault thresholds also generally results in a reduction of the operational shock performance characteristics of the drive, as the drive is less tolerant to the application of external vibrations that tend to move the heads away from the centers of the followed tracks. Rather, efforts are continually underway to make disc drives more tolerant of such externally applied vibrations.

Consumer demand for disc drives with ever increasing data storage capacities and transfer rate performance levels has led disc drive manufacturers to attempt to achieve greater data storage densities and read/write channel capabilities in successive generations of drives, including balancing the conflicting requirements of enhanced error rate and transfer rate performance. It is to the furtherance of these efforts that the present invention is directed.

SUMMARY OF THE INVENTION

The present invention provides a method for optimizing disc drive data performance in the presence of rotational vibration through the selection of optimal reader/writer offsets and write fault thresholds.

In accordance with preferred embodiments, a disc drive has a head with separate read and write elements which respectively read and write data from and to a plurality of tracks on a rotatable disc.

An initial offset for the head is identified as a radial distance between the read element and the write element as the head is positioned adjacent a selected track. Initial, asymmetric write fault thresholds for the selected track are selected on opposing sides of and at different radial distances from a center of the selected track, the write fault thresholds indicative of the maximum distance from track center that data can be written and successfully read within specified readback criteria.

The initial offset is adjusted to identify a final offset for the head in relation to the asymmetry of the initial write fault thresholds. Final, symmetric write fault thresholds are identified for the selected track. Read operations to the selected track are thereafter carried out using the final offset, and write operations to the selected track are suspended when the head moves away from the center of the selected track a distance greater than a selected one of the final first and second write fault thresholds.

These and various other features as well as advantages which characterize the present invention will be apparent from a reading of the following detailed description and a review of the associated drawings.

BRIEF DESCRIPTION OF THE DRAWINGS

FIG. 1 provides a top plan view of a disc drive constructed in accordance with a preferred embodiment of the present invention.

FIG. 6 provides a flow chart for a DISC DRIVE OPTIMIZATION routine, representative of steps carried out in accordance with preferred embodiments to select optimal reader/writer offsets and write fault thresholds by head/disc location in the disc drive of FIG. 1.

FIG. 16 provides a graphical representation of data obtained from the routine of FIG. 6.

FIG. 17 provides a graphical representation of data obtained from the routine of FIG. 6.

DETAILED DESCRIPTION

Figure 2:
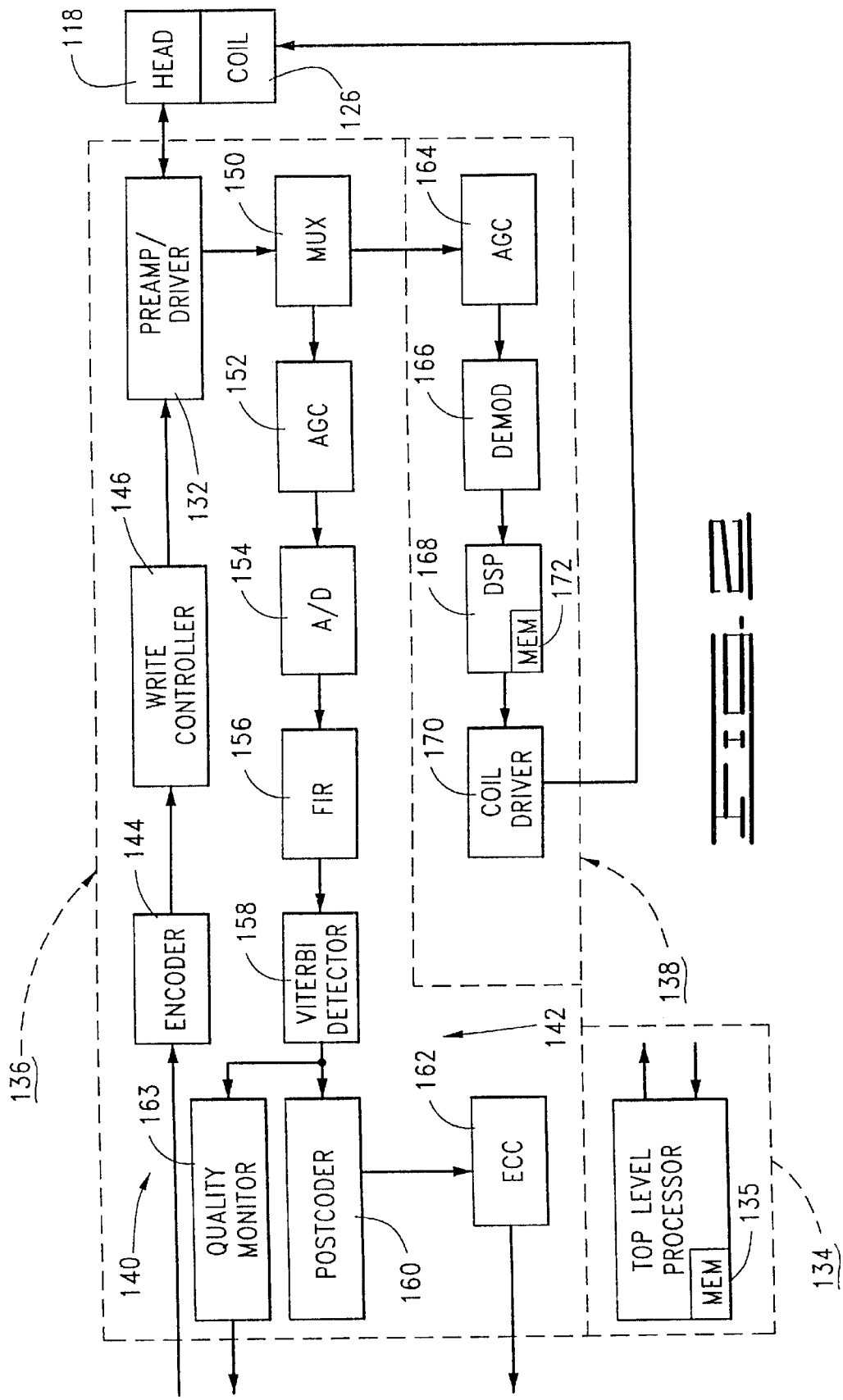
FIG. 2 provides a functional block diagram of relevant circuitry of the disc drive of FIG. 1.

In order to set forth a detailed description of various preferred embodiments of the present invention, it will be helpful to first briefly review the construction and operation of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor 106 rotates a plurality of magnetic recording discs 108 at a constant high speed (in thousands of revolutions per minute) in an angular direction denoted by arrow 109. User data are written to and read from tracks on the discs 108 through the use of an actuator assembly 110, which rotates about a bearing shaft assembly 112 adjacent the discs 108. The actuator assembly 110 includes a plurality of rigid actuator arms 114 which support flexible suspension assemblies 116 (flexures). A head 118 is supported at the end of each flexure 116 to interface with the corresponding disc surfaces.

When the disc drive 100 is not in use, the heads 118 are parked on landing zones 120 and the actuator assembly 110 is secured using a magnetic latch assembly 122. A voice coil motor (VCM) 124 controls the position of the heads 118 through application of current to a coil 126 which interacts with a magnetic circuit which includes a permanent magnet 128. A flex assembly 130 facilitates electrical communication between the actuator assembly 110 and a disc drive printed circuit board (PCB) mounted to the underside of the base deck 102, with the flex assembly 130 including a preamplifier/driver circuit 132 (preamp) which electrically interfaces with the heads.

FIG. 2 provides a functional block diagram of control circuitry of the disc drive 100. A top level processor 134 provides overall control of the disc drive 100 in response to commands from a host computer (not shown). A communications circuit 136 controls the transfer of data between the discs 108 and the host computer, and includes a write channel 140 to store the data and a read channel 142 to retrieve the data. A servo circuit 138 provides closed loop head positioning control. Each of these circuits will be discussed briefly as follows.

Beginning with the communications circuit 136, the write channel 140 comprises an encoder 144 which, upon receipt of input data, encodes the data with run length-limited and error correction code (ECC) encoding to facilitate clock recovery and recovered data integrity. The encoded data are provided to a write controller 146, which serializes the encoded data to generates control signals used by the preamp/driver circuit 132 to apply a time-varying write current to the head 118 to write the encoded data to the disc 108. The preamp/driver circuit 132 is preferably mounted to the actuator 110, as shown in FIG. 1.

The read channel 142 receives readback signals from the head 118 which, after preamplification by the preamp/driver circuit 148, are provided by a multiplexor (MUX) 150 to an automatic gain control (AGC) circuit 152, which controllably adjusts the amplitudes of the signals to a level appropriate for remaining portions of the read channel 142.

The signals output by the AGC circuit 152 are converted to a sequence of digital samples using an analog-to-digital (A/D) converter 154. A finite response filter (FIR) 156 filters the digital samples to a selected class of partial-response, maximum likelihood (PRML) filtering, such as EPR-4. A Viterbi detector 158 decodes the original encoded sequence from the FIR 154 and a postcoder 160 removes the RLL encoding. An error correction code (ECC) circuit 162 applies on-the-fly error detection and correction to output the originally stored data to the host computer.

The output from the Viterbi detector 158 is further provided to a quality monitor 163 which generates a status byte which represents the integral, or sum, of the square of the sampled data bit error values recovered during the read operation. The magnitude of this status byte ("channel quality measurement") is representative of the overall quality of the data signal during the read event; the lower the magnitude, the higher the quality of the signal. Because the individual sample errors are squared, larger errors generally carry much more significance than smaller errors in the overall count.

The A/D converter 154 produces sample values over a symmetrical integer range (such as −18 to +18) and each sample received by the Viterbi decoder 158 will have one of three values corresponding to symbol values −1, 0 and +1 (such as −14, 0 and +14). Samples other than these will have non-zero error values. Accordingly, the Viterbi decoder 158 provides these error values to the quality monitor 163 which accumulates the same to generate the channel quality measurements. The quality monitor 163 can be polled and reset by the top level processor 134 as desired.

The servo circuit 138 includes an AGC 164 which, like the AGC 152, controllably adjusts the amplitudes of readback servo signals read by the head 118 to a level appropriate for remaining portions of the servo circuit 138. A demodulator circuit 166 conditions the readback servo signals, including conversion to digital form, for processing by a digital signal processor (DSP) 168.

The DSP 168 controls the operation of the servo circuit 138 in response to commands issued by the top level processor 134. During a track following mode of operation, the DSP 168 generates a position error signal (PES) indicative of the position of the head 118 relative to the followed track and, in response to a desired position for the head 118, outputs a current command signal to a coil driver 170 which adjusts the amount of current applied to the coil 126 to maintain the head in a desired relation with the track. The servo circuit 138 also makes small, controlled adjustments to move the head to selected positions with respect to the center of the followed track, as discussed below. Programming for the DSP 168 is provided in DSP memory (MEM) 172.

Figure 3:
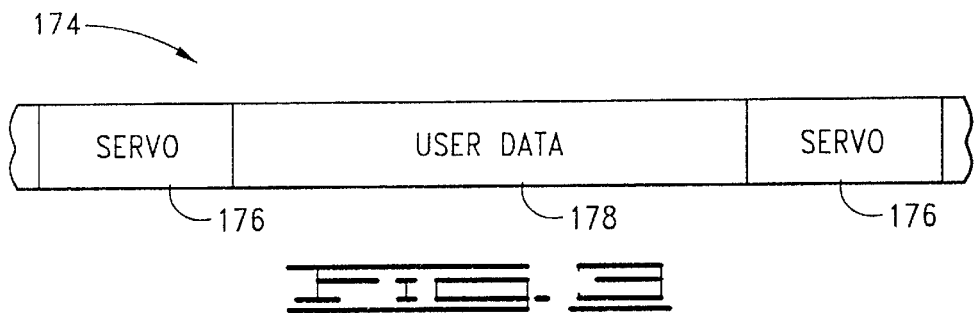
FIG. 3 shows a representation of a portion of a selected track on the disc of FIG. 1.

FIG. 3 provides a schematic representation of a portion of a selected track 174 to illustrate the general manner in which data are stored on the discs 108. The track 174 includes periodically disposed servo fields 176 containing servo data written during disc drive manufacturing and utilized by the servo circuit 138. Between each pair of adjacent servo fields 176 is a user data field 178 wherein one or more data sectors are defined during a disc drive formatting operation. User data are thereafter stored to these sectors by the write channel 140 of FIG. 2.

Figure 4:
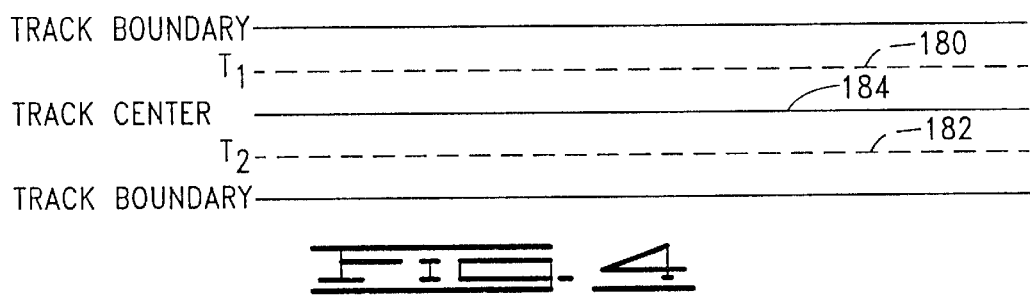
FIG. 4 shows write thresholds at selected radial distances from the center of a track, the write thresholds selected in accordance with preferred embodiments of the present invention.

To minimize interference between data written to adjacent tracks, write fault thresholds 180, 182 are provided for each track, represented in FIG. 4 as $T_1$, $T_2$ respectively. The write fault thresholds are determined for each track to indicate the maximum radial distance (in terms of percentage off-track from a track center 184) the head 118 can depart from the track center and still safely write data to the particular track. The servo circuit 138 continually monitors the position of the head 118 and declares a write fault at such time that the head 118 moves to a position beyond the write fault thresholds 180, 182, thereby preventing the write channel 140 from carrying out a write operation to the associated disc 108.

Selecting appropriate write fault threshold values is particularly important in light of the various performance specifications associated with a given disc drive. For example, disc drives of the present generation are typically required to transfer data at no lower than a selected transfer rate even in the presence of externally applied vibrations that can severely tax the ability of the servo circuit 138 to maintain the heads 118 on track. With reference again to FIG. 1, two typical types of vibration that can be applied to the disc drive 100 are translational vibration, and rotational vibration. Translational vibration tends to move the base deck 102 along a selected plane of the disc drive 100 (such as a plane parallel to the discs 108), as would generally be induced by vibration vectors 186, 188. Rotational vibrations tend to rotate the base deck 102 about an axis normal to a plane of the disc drive, such as would be generally induced by opposing vibration vectors 186, 190.

Rotational vibration is particularly detrimental to the operational performance of the disc drive 100 because of the relative movement induced between the heads 118 and the discs 108. The discs 108 are rigidly mounted (via the spindle motor 106) to the base deck 102 and so will move in relation to the amplitude and phase of the applied rotational vibration. The actuator 110, however, as a free body, will tend to remain in place; hence, the discs 108 will move back and forth under the heads 118, causing off-track errors in head position, also referred to as non-repeatable runout (NRRO).

Figure 5:
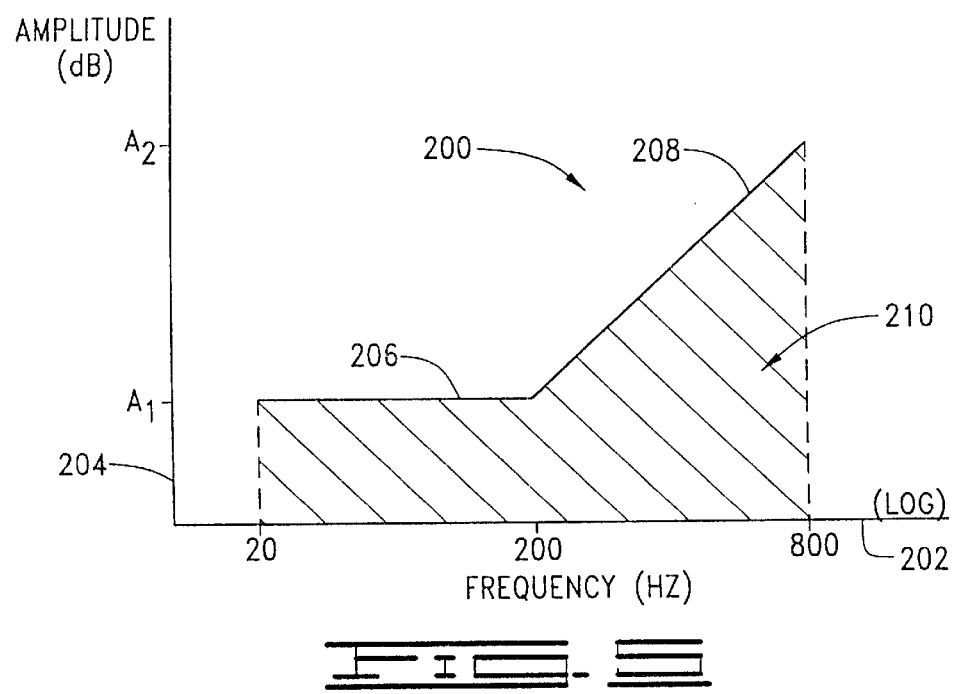
FIG. 5 graphically illustrates a rotational vibration rejection specification for the disc drive of FIG. 1.
Figure 5:
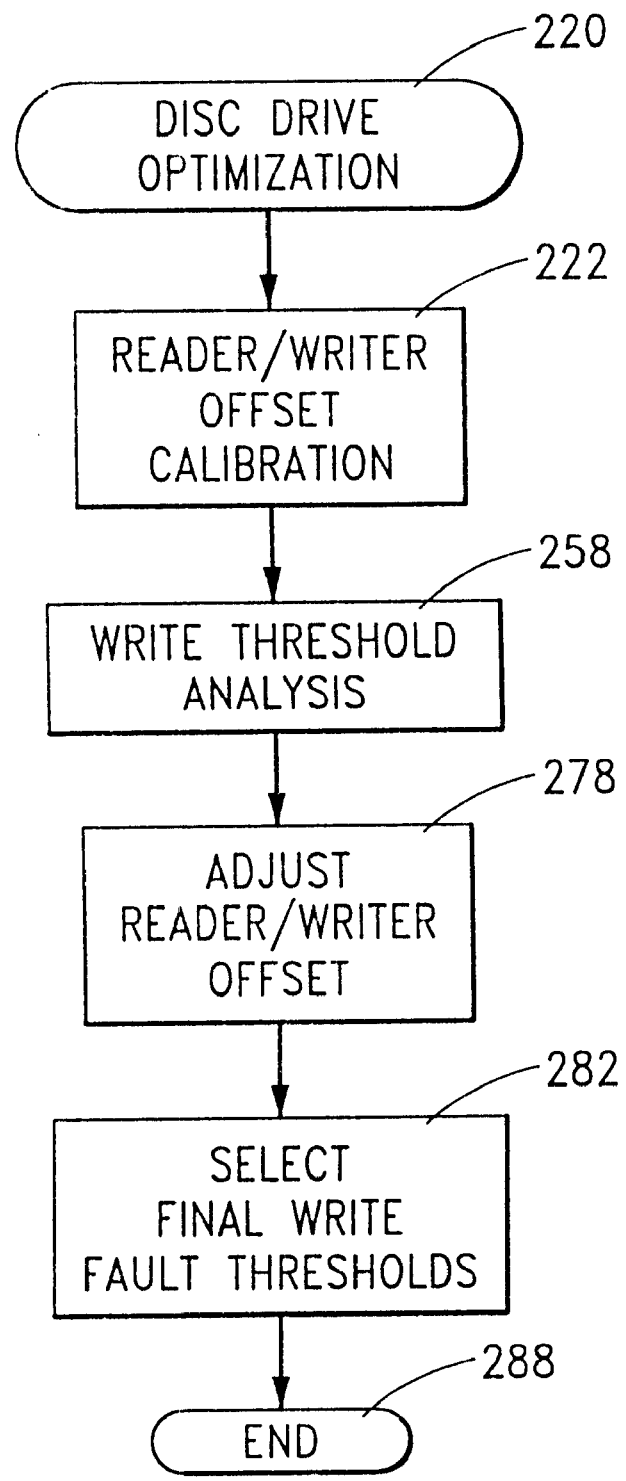

FIG. 5 shows a graphical representation of an operating curve 200 to illustrate a typical design specification for a disc drive in terms of the ability to reject externally applied rotational vibration. The operating curve 200 is plotted against a (log) x-axis 202 indicative of frequency and a y-axis 204 indicative of amplitude (dB). From FIG. 5, it can be seen that the operational frequency range of interest extends from 20 hertz (Hz) to 800 Hz, with the drive 100 being required to operably reject rotational vibration below an amplitude $A_1$ from 20 Hz to 200 Hz (as indicated by segment 206), and to operably reject rotational vibration from 200 Hz to 800 Hz with the amplitude linearly increasing from amplitude $A_1$ to amplitude $A_2$ (as indicated by segment 208). Area 210, defined under the operating curve 200 and bounded by 20 Hz and 800 Hz thereby defines the rejection range wherein the drive 100 must be able to operate, and for reference preferably represents a rotational vibration of 21 radians/second$^2$ (rad/s$^2$).

Typically, a disc drive will have nominally specified read and write data transfer rates (in bits/sec) under optimal conditions which then may or may not be relaxed under rotational vibration conditions. For example, the disc drive may be specified to write data in the presence of rotational vibration conditions with only a specified percentage degradation in transfer rate performance. Read operations may be required to occur at the nominal transfer rate at a first rotational vibration level (such as defined by FIG. 5) using on-the-fly error correction, and then at a reduced rate for rotational vibration at a higher level, even if in the latter case the drive has to enter an error recovery mode where various corrective measures are applied in an attempt to recover the data.

From the foregoing discussion it will be recognized that conflicting requirements must be balanced in order to select appropriate write fault thresholds 180, 182 for the disc drive 100. Relatively wider thresholds will reduce the occurrence of write faults in the presence of rotational vibration, but will also degrade data transfer performance under normal conditions since the read element may not be able to transduce the written data from such a wide possible write target area; contrawise, narrower thresholds will enhance data integrity under normal conditions, but will decrease the ability of the drive to operate in the presence of rotational vibration.

The present invention presents a methodology for selecting optimal write fault thresholds to enhance operation both under normal conditions as well as under rotational vibration conditions. FIG. 6 provides a DISC DRIVE OPTIMIZATION routine 220, preferably illustrating programming utilized by the top level processor 134 at appropriate times, such as during disc drive manufacturing or periodically during field use. It will be understood that the routine 200 is preferably carried out on a per-head basis for tracks at various locations on the discs 108, such as on a zone basis.

As shown at step 222, the disc drive 100 first undertakes a reader/writer offset calibration to determine initial offsets to compensate for the physical radial distance between separate read and write elements within each head 118 with respect to the associated disc 108. As will be recognized, disc drives of the present generation typically utilize heads that use separate read and write elements, such as magneto-resistive (MR) heads which use a thin film inductive write element and a magneto-resistive read element having a nominal resistance that is changed in relation to the application of a magnetic field of selected orientation. Two commonly used MR constructions include anisotropic magneto-resistive (AMR) and Giant magneto-resistive (GMR). It will be understood, though, that the present invention is not limited to these particular head construction types.

Figure 7:
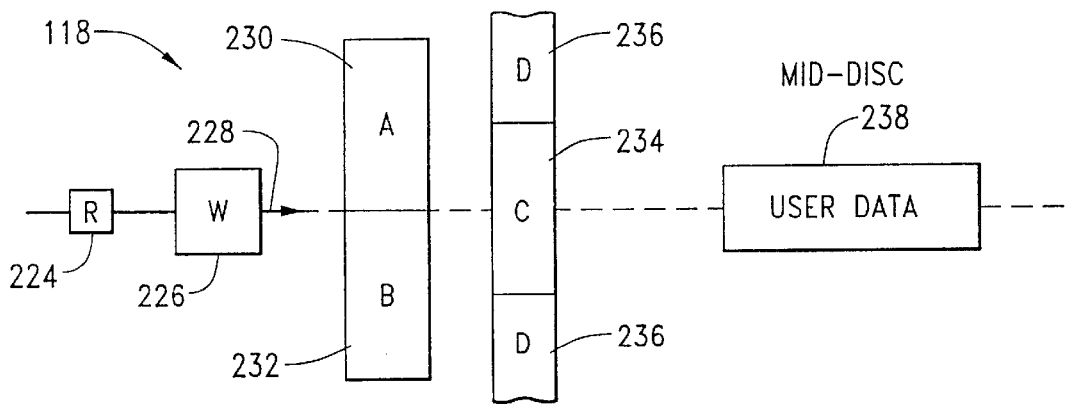
FIGS. 7–9 illustrate different skew angles for read and write elements of a selected head with respect to disc radius.
Figure 8:
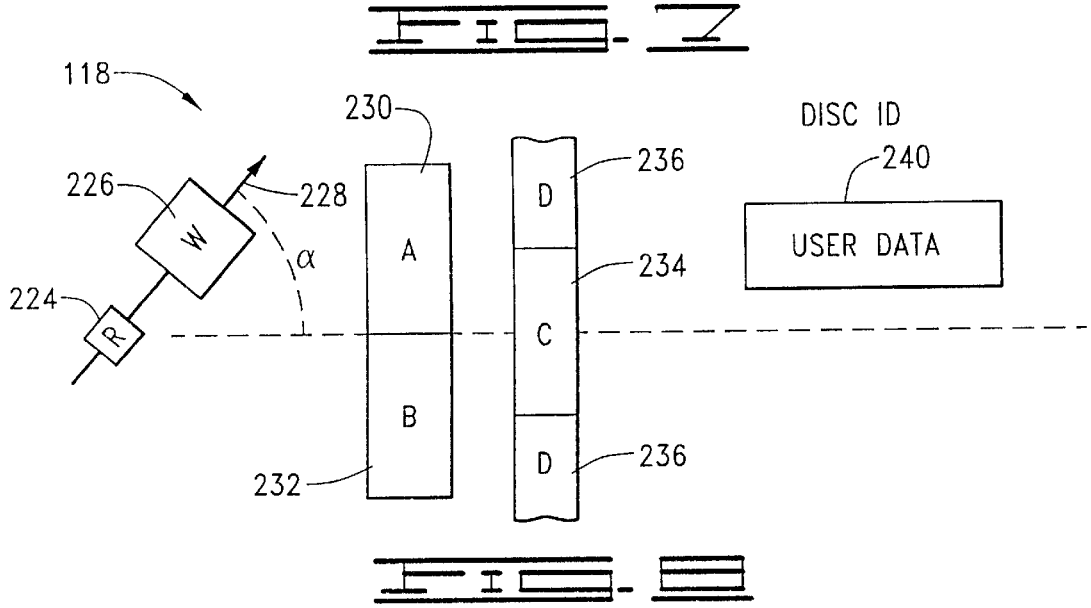
Figure 9:
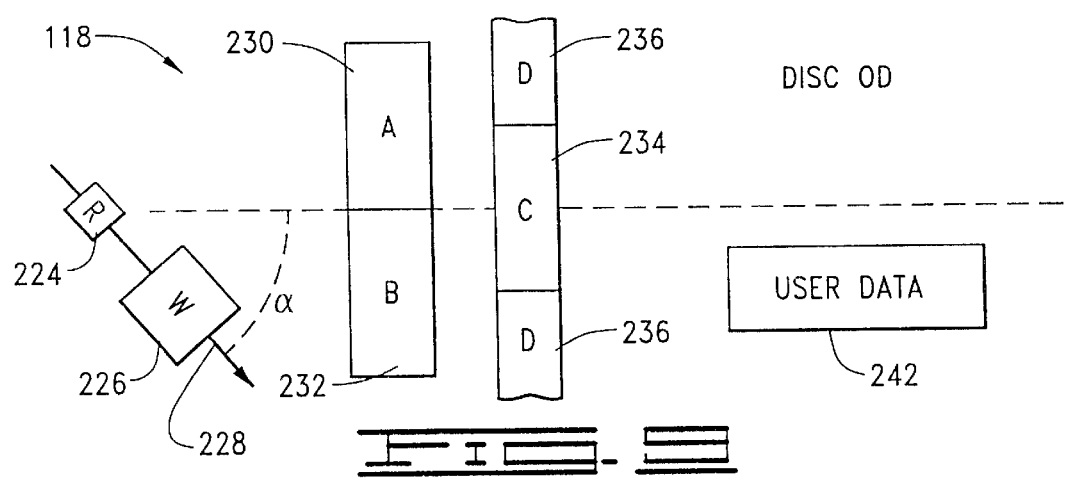

FIGS. 7–9 illustrate relative skew angles and associated offsets for a selected head 118 near mid-disc, near the disc inner diameter (ID), and near the disc outer diameter (OD). The head 118 includes a read element 224 and a write element 226 generally having relative operational widths as shown and aligned along an axis 228. Depending on the construction of the head 118 and the actuator 110, the axis 228 may pass through the actuator rotational axis, or may be offset therefrom.

The read element 224 transduces A, B, C and D burst patterns 230, 232 234 and 236 from the servo data fields 176 and the user data are written while the read element 224 maintains a selected relation to the burst patterns (such as at a null between adjacent A and B burst patterns which defines a track center). In FIG. 7, because the axis 228 is nominally aligned with the track being followed, a user data segment 238 written by the write element 226 in a subsequent user data field 178 will be aligned with the AB null. A skew angle α, defined as an angle between the axis 228 and the track, is substantially zero in FIG. 7.

In FIG. 8, the head 118 has a positive skew angle α as the head 118 is brought to the disc ID. During a write operation the read element 224 will be maintained at the AB null, but a user data segment 240 written by the write element 226 will be radially closer to the disc ID than the AB null. In FIG. 9, the head 118 has a negative skew angle α at the disc OD so that, during a write operation a user data segment 242 written by the write element 226 is closer to the disc OD than the AB null. During a subsequent read operation on the user data segments 240, 242 of FIGS. 8 and 9, corresponding adjustments in position of the read element (offsets) will be applied to place the read element 224 at nominally the same radii as the user data segments 240, 242. It is desirable to maintain the read element 224 over the AB nulls during write operations and apply the offsets to the read element 224 during read operations to enhance write performance, although the opposite convention could be used; that is, the offsets could be applied during write operations, and not applied during subsequent read operations.

There are a number of ways known in the art to determine appropriate offsets by head. In a preferred approach, data are written to each selected track while the read element 224 is maintained in a desired position relative to the servo data (such as at the AB nulls of the selected track). The data are then successively read while advancing the read element 224 to positions away from the track center, and a channel quality measurement is obtained from the quality monitor 163 (FIG. 2) for each successive offset position.

Figure 10:
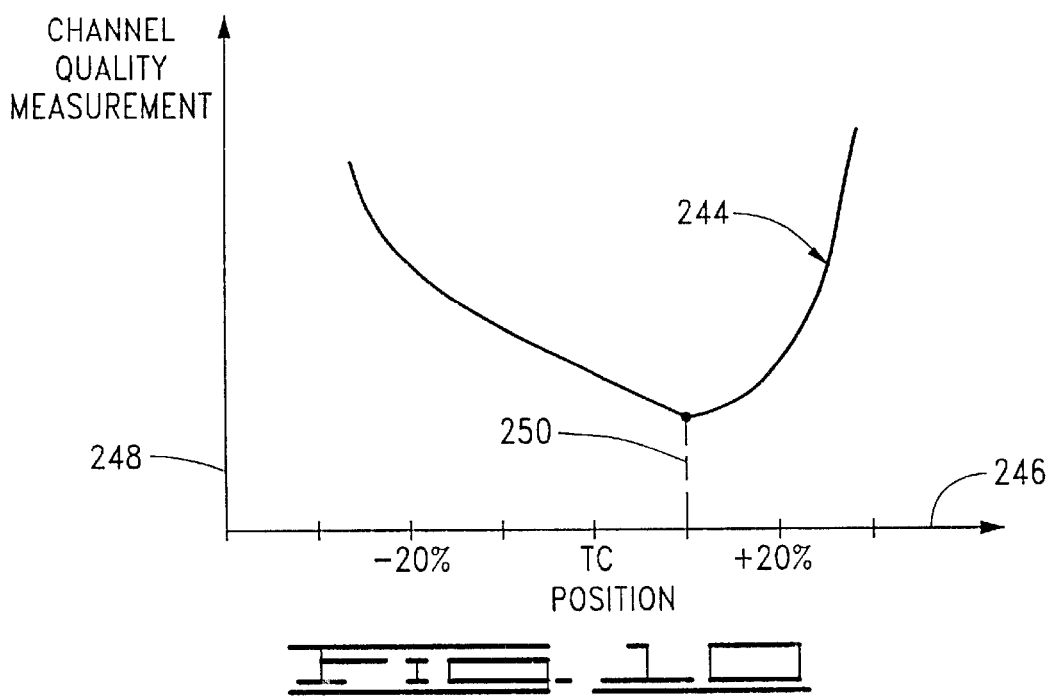
FIG. 10 provides a graphical representation of channel quality measurement data obtained from the routine of FIG. 6.

The results of this operation for a selected head/disc location are graphically set forth in FIG. 10 by a quality measurement curve 244, plotted against an x-axis 246 indicative of position and a y-axis 248 indicative of channel quality. The minimum point denoted by line 250 provides the best performance achieved during the routine, and corresponds to an off-track position of +10% of track width. For reference, a positive polarity is assigned for a direction toward the disc ID and a negative polarity is assigned for a direction toward the disc OD.

It follows that for the selected track in FIG. 10, the skew angle α is such that when the read element 224 is on track center, the data written by the write element 226 are centered 10% of a track pitch toward the disc ID. A subsequent read operation should therefore apply a +10% offset to the read element in order to place the read element 224 over the data.

Figure 11:
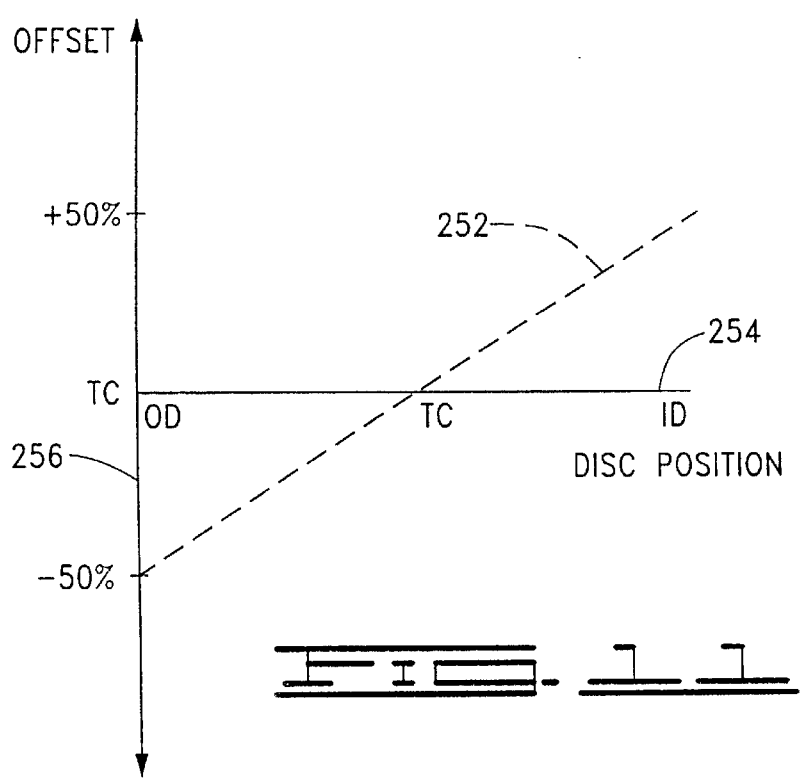
FIG. 11 is a graphical representation of an ideal offset curve showing relationship between offset and disc radius.

FIG. 11 provides a graphical illustration of an ideal track offset curve 252, plotted against an x-axis 254 indicative of disc position and a y-axis 256 indicative of offset. In this example, a generally linear relationship is shown for the offset so that tracks at the ID and OD have ±50% offsets and tracks at the midpoint of the disc 108 have an offset of zero. It will be understood that the relationship between offset and position will depend upon various factors including head construction, relative alignments of the actuator and the disc, and the radius of the disc (larger diameter discs will generally provide greater skew angles). Thus, different ranges of offset are readily envisioned with different drive configurations.

Continuing with FIG. 6, after initial offsets are selected for each of the head/disc location combinations (preferably by zone), the routine passes to a write fault threshold analysis 258 which identifies write fault thresholds by head for various disc locations. The operation of step 258 involves, for each selected head/disc combination, successively writing data to a selected track and an immediately adjacent track with corresponding offsets applied to the read element 224 so that the data are brought successively closer together.

After each offset is applied, the read element 224 is maintained over track center and the data from the selected track are read a number of times while the top level processor 134 counts the number of uncorrected errors that occur; that is, the number of times that the use of on-the-fly error correction fails to correct all errors in the readback data. As discussed above, the disc drive 100 applies on-the-fly error detection and correction to correct up to a selected number of errors in the readback data. Normally, when more errors are detected than can be corrected by the ECC circuit 162, the drive reports an error to the host and enters a readback error recovery routine where various error recovery techniques are applied in an attempt to recover the data.

In the present operation, the number of times that the drive would have to enter the error recovery routine to correct the data is accumulated; actual application of these error recovery techniques is preferably suspended as being both time consuming and unnecessary. Other specified readback criteria can be used in lieu of uncorrected error events, such as read error rates or channel quality measurements. Uncorrected error events are preferred, however, based on the rotational vibration read performance specification mentioned above.

As the data are successively brought closer together, it will become increasingly difficult for the read element 244 to properly transduce the data, both because of the reduced magnetization signal strength received at the read element 224 as well as the increased levels of magnetic interference from the data written to the adjacent track. It will be noted that the writing of the data in this manner simulates the presence of position error induced during rotational vibration conditions.

Figure 12:
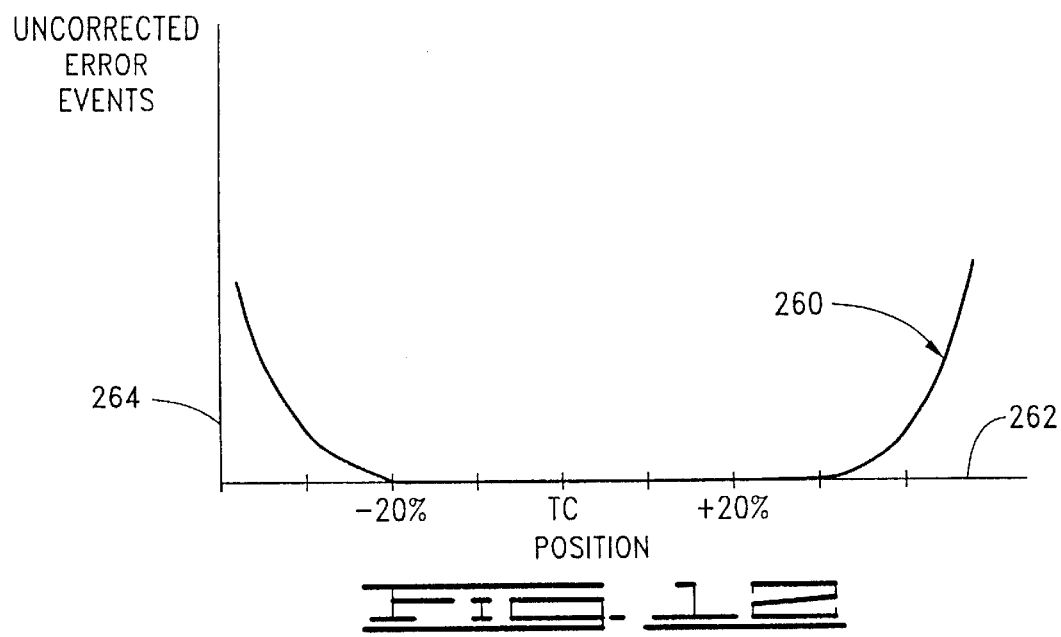
FIG. 12 provides a graphical representation of uncorrected error events detected during the routine of FIG. 6.
Figure 13:
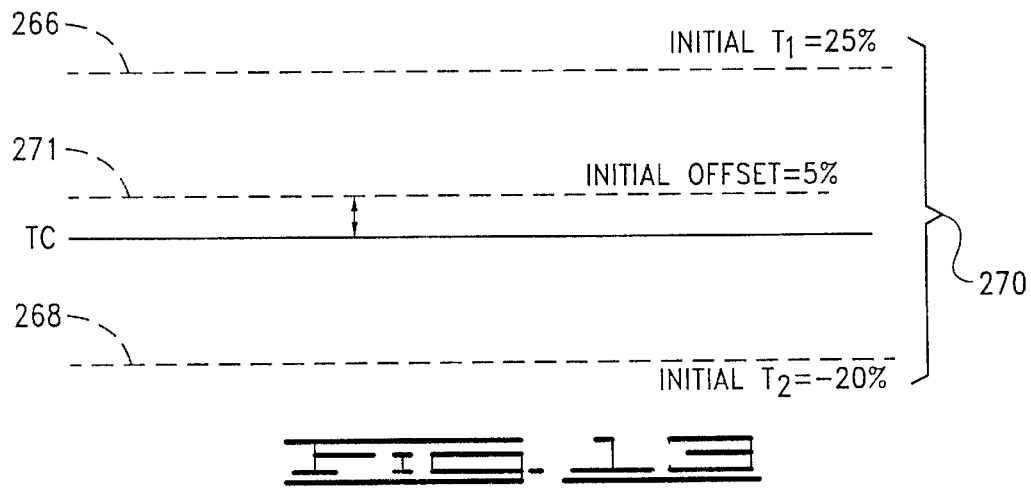
FIG. 13 shows a portion of a selected track with asymmetric first and second write fault thresholds and an initial offset determined by the routine of FIG. 6.

The operation is repeated for the selected track and the other adjacent track opposite the first adjacent track. FIG. 12 provides a graphical representation of the results of these operations. Curve 260, plotted against x-axis 262 indicative of position and y-axis 264 indicative of the number of uncorrected error events, shows no error events were recorded for data written up to 25% away from the center of the selected in the positive direction toward the disc ID, and no error events were observed for data written up to 20% in the negative direction toward the disc ID. Resulting initial write fault thresholds of $T_1=25\%$ and $T_2=20\%$ are shown in FIG. 13 at 266, 268, respectively, for a selected track 270. For reference, it is contemplated that an initial reader offset of +5%, as shown by line 271, was previously determined for the selected track 270 during the operation of step 222.

Asymmetric nonuniform write fault thresholds such as shown in FIG. 13 will typically occur for at least selected tracks for which the write fault threshold analysis is performed. Such asymmetric nonuniform write fault thresholds can arise as a result of a number of factors, including construction variations within the heads 118. Anisotropic MR heads often have characteristically asymmetrical reader sensitivity functions as the read elements are moved across magnetically recorded areas on the discs, as shown by response curve 272 in FIG. 14. An x-axis 274 in FIG. 14 indicates position across the active region of the read element 224 and a y-axis 276 indicates signal strength response. The steeper slope on the right side of the response curve 272 means that reader sensitivity will drop off more rapidly as the read element 224 is moved toward the disc ID as opposed to the disc OD across a given data segment on the track 270.

Continuing with FIG. 6, the routine next passes to step 278 where the initial offsets determined in step 222 are adjusted using the initial write fault thresholds determined in step 258. Preferably, this is carried out as follows:

$$\text{final offset} = \text{initial offset} + \frac{\text{initial } T_1 + \text{initial } T_2}{2} \quad (1)$$

Figure 14:
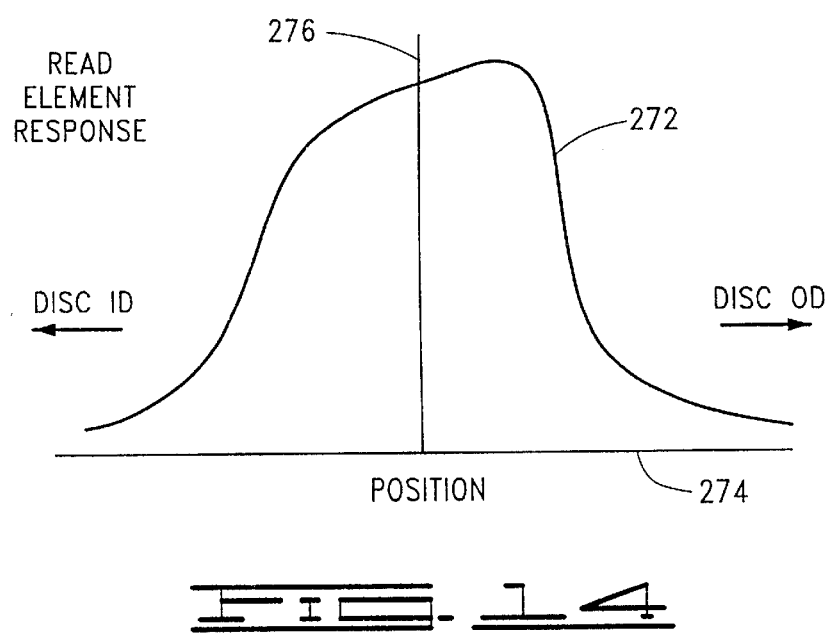
FIG. 14 provides a graphical representation of a read element response function, illustrating an asymmetric readback response typically observed with anisotropic magneto-resistive (AMR) heads.

The term added to the initial offset in equation (1) is referred to as an adjustment value. Using the track 270 in FIG. 13 which has an initial offset of +5%, $T_1$ of +25% and $T_2$ of −20%, the final offset for the track 244 is calculated as:

$$\text{final offset} = 5 + \frac{25 + -20}{2} = 5 + 2.5 = 7.5 \quad (2)$$

with this final offset of 7.5% shown in FIG. 14 at line 280. Final write fault Thresholds $T_1$, $T_2$ are selected at step 282 in FIG. 6 preferably by subtracting the adjustment value as follows:

$$\text{final } T_1 = \text{initial } T_1 - \frac{\text{initial } T_1 + \text{initial } T_2}{2} \quad (3)$$

$$\text{final } T_2 = \text{initial } T_2 - \frac{\text{initial } T_1 + \text{initial } T_2}{2}$$

Figure 15:
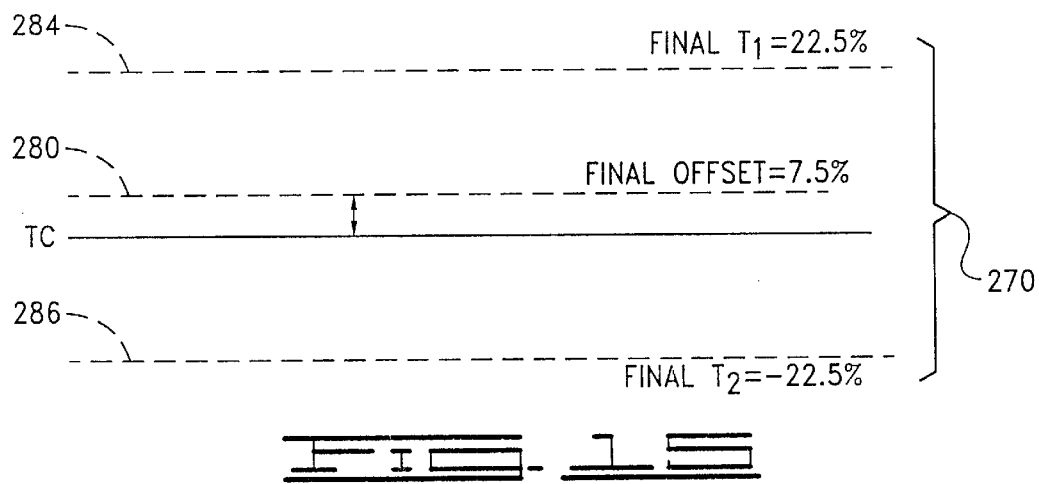
FIG. 15 shows the track of FIG. 13 with a final offset and symmetric first and second write fault thresholds.

In the present example, the final $T_1$, $T_2$ thresholds of ±22.5% are shown respectively at 284, 286 in FIG. 15. The routine then ends at 288.

FIGS. 16 and 17 graphically illustrate the operation of FIG. 6, both before and after the adjustments of steps 278 and 282. More particularly, FIGS. 16 and 17 are plots against respective x-axes 290 indicative of disc position and y-axes 292 indicative of offset, with FIG. 16 showing initial offset curve 294 obtained from the operation of step 222 and nonuniform $T_1$, $T_2$ write fault threshold curves 296, 298 obtained from the operation of step 258. For reference, the disc 108 is divided into a total of 10 equal zones and a selected track in the middle of each zone was selected during steps 222 and 258.

Errors in the initial offsets can be generally observed in relation to the difference between the initial offset curve 294 and the ideal offset curve 252 (from FIG. 11), such errors arising from factors discussed above including asymmetric read element response.

The operation of steps 278 and 282 upon the data of FIG. 16 results in a final offset curve 300 and symmetric $T_1$, $T_2$ write fault threshold curves 302, 304, as shown in FIG. 17. The final offset curve 300 exhibits reduced error compared to the initial offset curve 294 of FIG. 16. The values of FIG. 17 are thereafter used during disc drive operation; that is, write fault thresholds are determined by zone based on the values of curves 302, 304, and read offsets as shown by the final offset curve 300 are applied to the read element 224 during subsequent read operations. Thus, the routine of FIG. 6 advantageously establishes optimum reader/writer offsets and write fault thresholds to optimize disc drive performance during both normal conditions as well as in the presence of rotational vibration.

In summary, the present invention is directed to an apparatus and method for optimizing disc drive performance. In accordance with preferred embodiments, a disc drive 100 has a head 118 with separate read and write elements 224, 226 which read and write data from and to a plurality of tracks 270 on a rotatable disc 108.

An initial offset 271 for the head is identified as a radial distance between the read element and the write element as the head is positioned adjacent a selected track (step 222). Initial, asymmetric first and second write fault thresholds 266, 268 for the selected track are next selected on opposing sides of and at different radial distances from a center of the selected track (step 258), the write fault thresholds indicative of the maximum distance from track center that data can be written and successfully read within specified readback criteria.

The initial offset is adjusted to identify a final offset 280 for the head in relation to the initial first and second write fault thresholds (step 278), and final, symmetric first and second write fault thresholds are identified for the selected track on opposing sides of and at the same radial distance from the center of the selected track (step 282), wherein writing of data to the selected track is suspended when the read element moves away from the center of the selected track a distance greater than a selected one of the final first and second write fault thresholds.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for optimizing performance of a disc drive having a head with separate write and read elements to respectively write and read data to and from a plurality of tracks defined on a rotatable disc, comprising steps of:
   (a) identifying an initial offset for the head as a radial distance between the read element and the write element as the head is positioned adjacent a selected track;
   (b) selecting initial, asymmetric first and second write fault thresholds for the selected track on opposing sides of and at different radial distances from a center of the selected track;
   (c) adjusting the initial offset to identify a final offset for the head in relation to the initial, asymmetric first and second write fault thresholds; and
   (d) selecting final, symmetric first and second write fault thresholds for the selected track on opposing sides of and at a common radial distance from the center of the selected track, wherein writing of data to the selected track is suspended when the read element moves away from the center of the selected track a distance greater than a selected one of the final, symmetric first and second write fault thresholds.

2. The method of claim 1, wherein the identifying an initial offset step (a) comprises steps of:
   (a1) maintaining the read element at a nominally fixed radius of the disc;
   (a2) passing write currents to the write element to write data to the selected track;
   (a3) using the read element to transduce the data written in step (a2) while incrementally moving the read element with respect to the nominally fixed radius; and
   (a4) identifying the initial offset as a distance at which the read element successfully transduces the data using specified readback criteria.

3. The method of claim 1, wherein the selecting initial, asymmetric first and second write fault thresholds step (b) comprises steps of:
   (b1) identifying the initial, asymmetric first write fault threshold as a maximum distance from the center of the selected track in a direction toward the innermost diameter of the disc that data can be written and subsequently transduced by the read element using specified readback criteria; and
   (b2) identifying the initial, asymmetric second write fault threshold as a maximum distance from the center of the selected track in a direction toward the outermost diameter of the disc that data can be written and subsequently transduced by the read element using specified readback criteria.

4. The method of claim 1, wherein the adjusting the initial offset step (c) comprises steps of:
   (c1) generating an adjustment value in relation to one-half a difference between the respective different radial distances of the initial, asymmetric first and second write fault thresholds; and
   (c2) algebraically combining the adjustment value with the initial offset to identify the final offset.

5. The method of claim 1, wherein the selecting final, symmetric first and second write fault thresholds step (d) comprises steps of:
   (d1) generating an adjustment value in relation to one-half a difference between the respective different radial distances of the initial, asymmetric first and second write fault thresholds;
   (d2) algebraically combining the initial, asymmetric first write fault threshold with the adjustment value to determine the final, symmetric first write fault threshold value; and
   (d3) algebraically combining the initial, asymmetric second write fault threshold with the adjustment value to determine the final, symmetric second write fault threshold value.

6. In a disc drive having a head with separate read and write elements adjacent a rotatable disc on which a plurality of tracks are defined, the disc drive having an offset as a radial distance between the read element and the write element as the head is positioned adjacent a selected track, the offset selected in accordance with a method comprising steps of:
   (a) maintaining the read element at a nominally fixed radius of the disc;
   (b) passing write currents to the write element to write data to the selected track;
   (c) using the read element to transduce the data written in step (b) while incrementally moving the read element with respect to the nominally fixed radius; and
   (d) identifying the offset as a distance at which the read element successfully transduces the data using specified readback criteria;
the improvement characterized as the method further comprising steps of:
   (e) selecting initial, asymmetric first and second write fault thresholds for the selected track on opposing sides of and at different radial distances from a center of the selected track;
   (f) adjusting the offset identified in step (d) to form a final offset for the head in relation to the initial, asymmetric first and second write fault thresholds; and
   (g) selecting final, symmetric first and second write fault thresholds for the selected track on opposing sides of and at the same radial distance from the center of the selected track wherein writing of data to the selected track is suspended when the read element moves away from the center of the selected track a distance greater than a selected one of the final, symmetric first and second write fault thresholds.

7. The improvement of claim 6, wherein the selecting initial, asymmetric first and second write fault thresholds step (e) comprises steps of:

(e1) identifying the initial, asymmetric first write fault threshold as a maximum distance from the center of the selected track in a direction toward the innermost diameter of the disc that data can be written and subsequently transduced by the read element using specified readback criteria; and (e2) identifying the initial, asymmetric second write fault threshold as a maximum distance from the center of the selected track in a direction toward the outermost diameter of the disc that data can be written and subsequently transduced by the read element using specified readback criteria.

8. The improvement of claim 6, wherein the adjusting the offset step (f) comprises steps of:

(f1) generating an adjustment value in relation to one-half a difference between the respective different radial distances of the initial, asymmetric first and second write fault thresholds; and (f2) algebraically combining the adjustment value with the offset to identify the final offset.

9. The improvement of claim 6, wherein the selecting final, symmetric first and second write fault thresholds step (g) comprises steps of:

(g1) generating an adjustment value in relation to one-half a difference between the respective different radial distances of the initial, asymmetric first and second write fault thresholds; and (g2) algebraically combining the initial, asymmetric first write fault threshold with the adjustment value to determine the final, symmetric first write fault threshold value; and (d3) algebraically combining the initial, asymmetric second write fault threshold with the adjustment value to determine the final, symmetric second write fault threshold value.

* * * * *